3,009,812
STABILIZED ICINGS AND PROCESS

Alexander Jerome Ganz, Wilmington, Del., assignor to Hercules Powder Company, Wilmington, Del., a corporation of Delaware
No Drawing. Filed June 6, 1960, Ser. No. 33,927
20 Claims. (Cl. 99—139)

This invention relates to improved food products and more particularly to stabilized icings and to the preparation of said icings.

Icings are coatings, the basic ingredients of which include water and sugar. The characteristics and properties of icings may be modified by use of one or more of a plurality of additives including, e.g., fats, aerating agents, milk, salt, coloring, flavoring. Examples of types of icings are (1) water base icings of high specific gravity comprising sugar, water, and additives to provide the desired characteristics, (2) water base icings of low specific gravity into which air has been incorporated comprising sugar, water, aerating agent and other additives if desired and (3) icings (either aerated or not) comprising sugar, water and additives as desired plus a considerable proportion of fat. These icings are the types usually applied to wrapped and unwrapped baked goods.

The characteristics and properties of icings may be modified by variation of the constituents and additives used and the method of preparation to produce a large variety of icings including, e.g., those known in the trade as meringue, marshmallow cream, buttercream, flat and fudge icings.

Although the properties desired in an icing will vary with the use to be made of the icing, a universal requirement is stability. By stability is meant the ability of the icing to retain its original properties and to separate substantially no liquid during storage or use, the latter sometimes being referred to as bleeding. In addition to preventing or minimizing bleeding, it is desirable to prevent or minimize crystallizing, drying, cracking, hardening, and changes in texture in general of the icings. A further desire for wrapped goods is to minimize the adherence of the icing to the wrapper, which wrapper is often cellophane or other synthetic transparent wrapper.

Insofar as I am aware, materials heretofore used in icings have failed to impart the desired degree of stability to the icings, and in many cases the reason is not known to the art.

An object of the present invention is improved food products. A further object is the preparation of icings of improved stability. Another object is the preparation of icings which do not adhere to the wrapper. A still further object is a method of preparing said icings. The above and other objects will be apparent from the description of this invention given hereinafter.

I have found according to this invention that excellent stabilization of icings is obtained by incorporating therein a protein and a hydrophilic colloid. The protein must be hydratable but water insoluble under the conditions of use and the hydrophilic colloid must be water soluble or water dispersible. By water insoluble I do not mean to imply that the protein must be completely impervious to water, i.e., that it does not hydrate at all; instead, I mean a protein which is hydratable but capable of being removed from aqueous solution by the conventional physical methods of filtration, centrifugation, etc., or modifications thereof and I exclude those proteins (e.g., devitalized gluten) which do not hydrate significantly. For the above reasons in referring in the specification to the proteins applicable to this invention, I have used the terminology "hydratable but water-insoluble proteins."

The following examples illustrate various embodiments of this invention, but these examples are not intended to limit the invention beyond the scope set forth in the appended claims. In the examples and elsewhere herein parts and percent are by weight, cellulose gum is sodium carboxymethylcellulose, sometimes abbreviated as CMC, and these designations are well known in the trade.

Example 1

Step $a$:                                       Parts
   Granulated sugar_____ 220
   Cellulose gum, D.S. 0.7_____ 1
   Water_____ 120
   Heat to boiling. This gives a syrup.
Step $b$: Icing sugar_____ 659
   Slowly add the syrup prepared in step $a$ to the icing sugar and mix until smooth.

This icing was spread on cinnamon rolls, wrapped in cellophane and stored for three days at 104° F. and 85% relative humidity. The icing was fairly stable for this period of time; however, when the wrapper was removed, a large part of the icing adhered to the wrapper.

Example 2

Example 1 was repeated except that only 0.5 part of cellulose gum, D.S. 0.7 was used. The icing was partially melted which indicated poor stability. The icing also adhered to the wrapper.

In each of the following Examples 3–14 the icing was prepared, spread on rolls and stored as in Example 1 above.

Example 3

Step $a$:                                       Parts
   Granulated sugar_____ 220
   Vital gluten_____ 10
   Water_____ 120
Step $b$: Icing sugar_____ 650

The icing lacked gloss, was unstable and adhered to the wrapper.

Example 4

Step $a$:                                       Parts
   Granulated sugar_____ 220
   Vital gluten_____ 5
   Cellulose gum, D.S. 0.7_____ 0.5
   Water_____ 120
Step $b$: Icing sugar_____ 654.5

The icing was quite stable and it did not adhere to the wrapper.

Example 5

Step $a$:                                       Parts
   Granulated sugar_____ 220
   Vital gluten_____ 0.5
   Cellulose gum, D.S. 0.7_____ 0.1
   Water_____ 120
Step $b$: Icing sugar_____ 659.4

While there was some development of crystallinity and a slight amount of melting, the icing was satisfactorily stable and did not adhere to the wrapper.

Example 6

Step $a$:                                       Parts
   Granulated sugar_____ 220
   Vital gluten_____ 2.7
   Cellulose gum, D.S. 0.7_____ 2.7
   Water_____ 120.0
Step $b$: Icing sugar_____ 654.6

While the syrup prepared in step $a$ was somewhat "heavy," the icing was stable and did not adhere to the wrapper.

Example 7

Step *a*:

| | Parts |
|---|---|
| Granulated sugar | 220.0 |
| Vital gluten | 5.0 |
| Agar agar | .5 |
| Water | 120.0 |
| Step *b*: Icing sugar | 654.5 |

The icing was quite stable and it did not adhere to the wrapper.

Example 8

Step *a*:

| | Parts |
|---|---|
| Granulated sugar | 220.0 |
| Glutenin | 5.0 |
| Cellulose gum, D.S. 0.7 | 0.5 |
| Water | 120.0 |
| Step *b*: Icing sugar | 654.5 |

The icing was quite stable and it did not adhere to the wrapper.

Example 9

Step *a*:

| | Parts |
|---|---|
| Granulated sugar | 220 |
| Insoluble soy protein | 5 |
| Cellulose gum, D.S. 0.7 | 0.5 |
| Water | 120 |
| Step *b*: Icing sugar | 654.5 |

The icing was stable and did not adhere to the wrapper.

Example 10

Step *a*:

| | Parts |
|---|---|
| Granulated sugar | 220 |
| Gliadin | 2.5 |
| Cellulose gum, D.S. 0.7 | 0.7 |
| Water | 120 |
| Step *b*: Icing sugar | 656.8 |

The icing was stable and did not adhere to the wrapper.

Example 11

Step *a*:

| | Parts |
|---|---|
| Granulated sugar | 220 |
| Vital gluten | 5 |
| Wheat starch | 10 |
| Water | 120 |
| Step *b*: Icing sugar | 645 |

The syrup was heavy; however, the icing was stable and did not adhere to the wrapper.

Example 12

Step *a*:

| | Parts |
|---|---|
| Granulated sugar | 220 |
| Vital gluten | 5 |
| Hydroxypropyl wheat starch, D.S. 0.4 | 5 |
| Water | 120 |
| Step *b*: Icing sugar | 650 |

The syrup was heavy; however, the icing was stable and did not adhere to the wrapper.

Example 13

Step *a*:

| | Parts |
|---|---|
| Granulated sugar | 220 |
| Vital gluten | 5 |
| Hydroxyethyl cellulose, D.S. 2.5 | 0.5 |
| Water | 120 |
| Step *b*: Icing sugar | 654.5 |

The icing was stable and did not adhere to the wrapper.

Example 14

Step *a*:

| | Parts |
|---|---|
| Granulated sugar | 220 |
| Vital gluten | 5 |
| Guar gum | 0.5 |
| Water | 120 |
| Step *b*: Icing sugar | 654.5 |

The icing was stable and did not adhere to the wrapper.

From the above examples it will be readily apparent that the stabilizer mixture of this invention provides an icing having stabilized properties substantially superior to those heretofore obtained with prior art stabilizers. I do not know the mechanism by which these stabilizers function, and while I do not wish to limit the invention to any theory, the following is one possible explanation. It may be that the contribution of the water-insoluble hydratable protein is due, at least in part, to its ability to hydrate reversibly depending on time, temperature and composition of medium, thereby conferring a degree of flexibility in response to the system to change. In addition, the hydrophilic colloid increases the viscosity of the liquid phase of the icing. Also, it is conceivable that the hydrophilic colloid is sorbed on the surface of the protein, serving to "cement" the protein particles together and thereby causing the protein-hydrophilic colloid stabilizer to simulate a gel structure. In one sense this improved stabilization may be properly considered as a synergistic effect. Whatever the mechanism may be, however, the important thing is that I obtain substantially greater stabilization with my stabilizer composition than with prior art stabilizers, and for some reason this improvement is not realized by using the protein or hydrophilic colloid alone.

Although I have obtained somewhat better results with vital gluten as the protein and with CMC as the hydrophilic colloid, water-insoluble but hydratable proteins and hydrophilic colloids in general are applicable. These include, by way of example, the proteins vital gluten, gliadin, glutenin, soy protein, calcium caseinate and the hydrophilic colloids of cellulose derivatives such as carboxyalkyl cellulose ethers, e.g. carboxymethylcellulose, carboxyethyl cellulose, carboxypropyl cellulose; alkyl cellulose ethers, e.g. methyl cellulose; carboxyalkyl hydroxyalkyl cellulose ethers, e.g. carboxymethyl hydroxyethyl cellulose, carboxyethyl hydroxyethyl cellulose; hydroxyalkyl cellulose ethers, e.g. hydroxyethyl cellulose, hydroxypropyl cellulose; dextran; starch; starch derivatives such as carboxyalkyl starch ethers, e.g. carboxymethyl starch; hydroxyalkyl starch ethers, e.g. hydroxypropyl starch; and natural gums, e.g. guar gum, locust gum, karaya gum, gum arabic, agar agar, Irish moss, carrageenin, algin, sodium alginate, pectin, quince seed gum, psyllium seed gum, gum tragacanth.

In order to obtain satisfactory stabilization I must use at least about 0.05% protein and at least 0.01% hydrophilic colloid by weight of the total icing composition. Amounts greater than about 3% protein and 5% hydrophilic colloid by weight of the total icing composition are impractical. I have obtained excellent results with, for example, 0.45% vital gluten in combination with 0.05% sodium carboxymethylcellulose.

The manner in which the protein and hydrophilic colloid are incorporated in the icing is not critical. They may be incorporated separately, mixed together and then added, or they may be mixed together and codried and the codried product incorporated in the icing composition. While one would normally add these stabilizers to the icing syrup, they can be added to the icing sugar or to the mixture of icing syrup and icing sugar. In practically all instances the icing compositions of this invention will include sugar and water. In addition to these ingredients the icing composition may also contain various other materials well known to those skilled in the art, many of which are mentioned in the second paragraph of this application.

While I have illustrated this invention with respect to icing compositions on cinnamon rolls, my icing composition is useful wherever there is any need for a stabilized icing. For a wrapped product which contains an icing, my icing composition has the additional advantage that it at least minimizes, and in many cases completely eliminates, the icing adhering to the wrapper.

As many apparent and widely different embodiments of this invention may be made without departing from the

What I claim and desire to protect by Letters Patent is:

1. An icing composition comprising sugar and water, and as a stabilizer a protein and a hydrophilic colloid, the protein being water insoluble but hydratable under the conditions of incorporating it into the icing composition.

2. An icing composition comprising sugar and water, and as a stabilizer a water-insoluble hydratable protein and a hydrophilic colloid, the amount of protein and hydrophilic colloid by weight of the total icing composition being, respectively, 0.05%–3% and .01%–5%.

3. The icing composition of claim 2 wherein the protein is vital gluten.

4. The icing composition of claim 2 wherein the protein is glutenin.

5. The icing composition of claim 2 wherein the protein is gliadin.

6. The icing composition of claim 2 wherein the hydrophilic colloid is a water-soluble gum.

7. The icing composition of claim 2 wherein the hydrophilic colloid is a cellulose ether.

8. The icing composition of claim 2 wherein the hydrophilic colloid is a natural gum.

9. The icing composition of claim 2 wherein the protein is vital gluten and the hydrophilic colloid is carboxymethylcellulose.

10. The icing composition of claim 2 wherein the protein is vital gluten and the hydrophilic colloid is starch.

11. The icing composition of claim 2 wherein the protein is vital gluten and the hydrophilic colloid is hydroxypropyl starch.

12. The icing composition of claim 2 wherein the protein is vital gluten and the hydrophilic colloid is hydroxyethyl cellulose.

13. An icing composition comprising sugar and water, and as a stabilizer vital gluten and carboxymethylcellulose, the amounts of vital gluten and carboxymethylcellulose being 0.45% and 0.05%, respectively, by weight of the total icing composition, the vital gluten being water insoluble but hydratable under the conditions of incorporating it into the icing composition.

14. Process of stabilizing an icing composition comprising sugar and water, which process comprises incorporating with the icing ingredients a protein and a hydrophilic colloid, the protein being water insoluble but hydratable under the conditions of incorporating it into the icing composition.

15. Process of stabilizing an icing composition comprising sugar and water, which process comprises incorporating as stabilizers with the icing ingredients 0.05%–3% of a protein and .01%–5% of a hydrophilic colloid, the amounts of said stabilizers being by weight of the total icing composition, the protein being water insoluble but hydratable under the conditions of incorporating it into the icing composition.

16. Process of claim 15 wherein the protein is vital gluten and the hydrophilic colloid is a water-soluble gum.

17. Process of claim 15 wherein the protein is vital gluten and the hydrophilic colloid is carboxymethylcellulose.

18. Process of claim 15 wherein the protein is vital gluten and the hydrophilic colloid is starch.

19. Process of claim 15 wherein the protein is vital gluten and the hydrophilic colloid is hydroxypropyl starch.

20. Process of claim 15 wherein the protein is vital gluten and the hydrophilic colloid is hydroxyethyl cellulose.

References Cited in the file of this patent

UNITED STATES PATENTS

| | | |
|---|---|---|
| 2,163,913 | Otterbacher | June 27, 1939 |
| 2,353,307 | Joffe | July 11, 1944 |
| 2,846,314 | Aichele et al. | Aug. 5, 1958 |